Patented Aug. 18, 1953

2,649,476

UNITED STATES PATENT OFFICE 2,649,476

TRIFLUOROMETHYLATED DIPHENYL ETHER SULFONIC ACIDS

Henry Martin, Schaffhausen, Switzerland, assignor to Variapat A. G., Basel, Switzerland No Drawing. Application April 24, 1951, Serial No. 222,738. In Switzerland April 29, 1950

6 Claims. (Cl. 260—506)

It has been found that certain colourless and water-soluble condensation-products of the aromatic or heterocyclic series, containing trifluoromethyl groups have outstanding properties for the permanent protection of all kinds of textiles, but especially wool and also furs, feathers, hides, hairs and the like as well as articles made of such products against attack by textile pests.

Said condensation-products of the aromatic or heterocyclic series containing trifluoromethyl groups may be obtained by interaction of acylating agents with aromatic or heterocyclic aminosulphonic-acids containing an exchangeable hydrogen atom at the nitrogen atom, whereby the components of the reaction have to be so chosen that the end product contains at least one trifluoromethyl group, a sulphonic-acid-group and a diphenyl-radical or a diphenyloxide-, diphenylsulphide-, diphenylsulphoxide-, diphenylsulphone-, diphenylmethane-, diphenylcarbamide-, stilbene-radical respectively.

As acylating agents for these aminosulphonic-acids, sulphonic-acids as well as carboxylic-acids and their derivatives capable of reaction may be used. The term carboxylic-acids and their derivatives capable of reaction comprehends as well monobasic as polybasic carboxylic-acids. Besides these normal acids and their derivatives the various derivatives of the carbonic-acid or thiocarbonic-acid and of the cyanuric-acid are eminently suited.

The acylation of the above named aromatic or heterocyclic aminosulphonic-acids having free amino-groups may be accomplished with acids of the aliphatic-, araliphatic-, alicyclic-, aromatic- and heterocyclic-series. It is obvious that their functional derivatives like halides, esters, anhydrides and the like too may be used in the present process, as it is commonly known in the acylating technique.

For example the following carboxylic-acids or sulphonic-acids may be mentioned:

Capric acid, lauric acid, myristic acid, palmitic acid, stearic acid, palmkernel oil fatty acid, oleic acid, phenylacetic acid, p-chlorophenyl-acetic acid, 3,4-dichlorophenyl-acetic acid, cinnamic acid, p-chloro cinnamic acid, hydrocinnamic acid, phenoxy acetic acid, halogen substituted and alkylsubstituted phenoxy-acetic acids, hexahydrobenzoic acid, p-tolylic acid, benzoic acid, 3,4-dimethyl-benzoic acid, 4-chlorobenzoic acid, 3,4-dichlorobenzoic acid or 2,4-dichlorobenzoic acid, 2-chlorobenzoic acid, malonic acid, succinic acid, adipic acid, phthalic acid, sulphobenzoic acid, 3-trifluoromethyl - benzene - carboxylic acid, diphenylether-4-carboxylic acid, 2',4-dichloro-1,1'-diphenylether-4'-carboxylic acid, 2,4-dichloro-1,1'-diphenylether-4'-carboxylic acid, 4-chloro-1,1'-diphenylether-4'-carboxylic acid, 2-chloro-1,1'-diphenylether-4'-carboxylic acid, diphenylene oxide-3-carboxylic acid, 2-chloroquinoline-4-carboxylic acid, toluenesulphonic acid, 4-chlorobenzene-sulphonic acid, 3,4-dichlorobenzenesulphonic acid, trifluoromethylbenzene-sulphonic acid, 1-trifluoromethyl-4-chlorobenzene-3-sulphonic acid, diphenylether-4-sulphonic acid, 4-chloro-1,1'-diphenylether-4'-sulphonic acid.

Derivatives of carbonic- and thiocarbonic acid which may be condensed with the aromatic or heterocyclic aminosulphonic acids are halides, esters, amides, imides or anhydrides of said acids, whereby carbonic acid halides or thiocarbonic acid halides are carbonyl-chloride, thiocarbonyl-chloride, aliphatic, araliphatic, aliphatic-aromatic, aromatic and heterocyclic carbamic acid chlorides but also aliphatic, aromatic and araliphatic chlorocarbonic acid esters. There have proved particularly valuable trifluoromethylsubstituted but also halogen and/or alkyl substituted aromatic carbamic acid chlorides.

The condensation products in question may also be obtained with other derivatives of carbamic acid; for example by addition of the carbamic acid anhydrides or of substances delivering such derivatives of carbamic acid. Similar substances are formed by addition of aromatic or heterocyclic carbamic acid chloride sulphonic acids or isocyanate sulphonic acids to suitable aromatic or heterocyclic amines. Moreover the addition of saturated or unsaturated aliphatic, araliphatic or aromatic isothiocyanic acid esters and especially of halogen substituted oils of mustard to aromatic or heterocyclic aminosulphonic acids gives watersoluble compounds of high interest. But other methods as for example treatment of carbon disulphide with said aminosulphonic acids in the presence of suitable catalysts, for example hydrogenperoxide or sulphur leads to thiocarbamide derivatives. By warming, melting or heating in suitable solvents or suspension media of the aminosulfonic acids with urea or thiocarbamide or urethanes with splitting off ammonia or alcohol, similar products may be obtained.

Another method for preparing said water-soluble products of condensation which contain trifluoromethyl-groups, which works in two steps, consist in reacting aromatic or heterocyclic amines or their sulphonic acids with carbonic acid derivatives capable of double reaction, as for example halogenated carbonic acid esters, whereby said carbonic acid derivatives react at first only partially in one step whereupon these primary products of condensation are further reacted with e. g. amines substituted by trifluoromethyl-groups to form the desired products of condensation containing trifluoromethylgroups. On the other hand one may also start with amines or aminosulphonic acids containing trifluoromethyl-groups which are reacted with carbonic acid derivatives capable of double reaction e. g. halogenated carbonic acid phenylester in order to obtain the primary trifluoromethylgroup containing products of condensation which are then reacted with substituted amines to give the corresponding products of condensation containing trifluoromethylgroups.

Sulphonic acids with surprisingly good properties may also be obtained by aftertreatment of the finished difficultly soluble or insoluble carbamides or thiocarbamides containing at least one trifluoromethylgroup with a sulphonating agent.

The desired carbamide derivatives may also be obtained by condensation of alkyl- or arylcarboxylic acid azides or N-halogen carbonic acid amides with aminosulphonic acids with development of nitrogen or splitting off hydrohalide. In all these methods the substitution of the components must be such that the end product contains at least one trifluoromethylgroup. Said group may be in only one or in both of the components of reaction.

The carbamic acid halides, halogen carbonic acid esters, isocyanic acid esters and oils of mustard, used as initial material, can be obtained by the known processes. By treatment of primary or secondary aliphatic, aliphatic-aromatic, aromatic, heterocyclic, aralipathic amines such as aniline, toluidines, xylidines, trifluoromethylsubstituted anilines such as 1-amino - 3 - trifluoromethylbenzene, 1 - amino - 4-trifluoromethylbenzene, 1 - amino - 2 - trifluoromethylbenzene, 1-amino-2-methoxy-5-trifluoromethylbenzene, 1-amino -2- chloro -5- trifluoromethylbenzene, 1-amino - 2 - nitro - 4 - trifluoromethylbenzene, 1-amino - 3,5 - bis-trifluoromethylbenzene, 1-amino-2,5-bis-trifluoromethylbenzene, 4 - fluoro - methyl - 2 - aminophenylmethylsulphone, 4-amino- or 2-amino-trifluoromethylsulphonbenzene (prepared by reduction of p- or o-nitrotrifluoromethylsulphonbenzene SP 210 338) 2,4 - dichlorophenyl -6- amino -1- trifluoromethylsulphone (prepared by reduction of 2,4-dichlorophenyl - 6 - nitro - 1 - trifluoromethylsulphone), 2-methyl -4- chlorophenyl -6- amino-1-trifluoromethylsulphone (prepared by reduction of 2-methyl - 4 - chlorophenyl - 6 - nitro-1-trifluoromethylsulphone SP 211 777) 4-methylphenyl - 6 - amino - 1 - trifluoromethylsulphone (prepared by reduction of 4-methylphenyl-6-nitro-1-trifluoromethylsulphone SP 211 774), 4 - chloroaniline, 2 - chloroaniline, 3,4 - dichloroaniline, 2,5 - dichloraniline, 2,4 - dichloroaniline, 4 - chloro - 2 - aminophenyl - methylsulphone (SP 172 361), 5,8 - dichloro - 1 - naphthylamine, 3 - chloro - 4 - methyl - 6 - methoxy - aniline, 3-chloro-4-methyl-6-ethoxyaniline, 3,4-dichloro-6-methoxyaniline, 4-nitraniline, ethylaniline, 4-lauryl - aniline, laurylphenylamine, diphenylamine, 2 - aminobenzothiazole, 3,4,5 - trichloraniline, 2,4,5 - trichloraniline, laurylamine, α-dodecylbenzylamine, 4 - amino - 1,1' - diphenylether, 2-amino-1,1'-diphenylether, 4-amino-1,1'-diphenylsulfide, 4-amino-4'-chloro-1,1'-diphenylether, 4-amino-2'-chlorodiphenylether, 4-amino-2',4' - dichloro - 1,1' - diphenylether, 4 - amino - 3',4' - dichloro - 1,1' - diphenylether, 4 - amino - 3' - methyl - 4' - chloro - 1,1' - diphenylether, 4-amino-3', 5'-dimethyl-4'-chloro-1,1'-diphenylether, 4-amino-4'-methyl-1,1'-diphenylether, 4-amino - 4' - amyl - 1,1' - diphenylether, 2-chloro-4-amino-4'-chloro-1,1'-diphenylether, 2-chloro 4-amino - 3', 4' - dichloro - 1,1' - diphenylether, 2-chloro - 4 - amino - 4' - chloro - 1,1' - diphenylsulphide, 2-amino -4'- chloro - 1,1' - diphenylsulphide, 2 - amino -3', 4'- dichloro -1,1' - diphenylsulphide, 2-amino -4,4'- dichloro -1,1' - diphenylether, 2-amino - 4,4' - dichloro - 1,1' - diphenylsulphide, 2- amino - 4 - chloro - 4' - methyl -1,1'- diphenylether, 2-amino - 4,3', 4' - trichloro - 1,1'-diphenylether, 2-amino-3'-methyl-4,4'-dichloro-1,1' - diphenylether, 2 - amino - 4' - chloro - 4-trifluoromethyl - 1,1' - diphenylether, 2 - amino - 4' - methyl - 4 - trifluoromethyl - 1,1 - diphenylether, 2 - amino - 4' - amyl - 4 - trifluoromethyl - 1,1' - diphenylether, 2 - amino - 4' - chloro - 4-trifluoromethyl-1,1'-diphenylsulphide, 4-amino-4' - chlorodiphenyl, 4 - amino - 4' - acetylaminodiphenyl, 2 - amino - 3' - trifluoromethyl - 1,1'-diphenylether, 2 - amino - 4 - chloro - 3' - trifluoromethyl - 1,1 - diphenylether, 4 - chloro - 3'-amino - diphenylenoxide, 4 - amino - 4' - chloro-2-trifluoromethyl - 1,1' - diphenylether, 4-amino-4'-methyl - 2 - trifluoromethyl - 1,1' - diphenylether, 4 - amino - 3', 4' - dichloro - 2 - trifluoromethyl-1,1'-diphenylether, 4-amino-4'-chloro-2 - trifluoromethyl - 1,1' - diphenylsulphide, 4 - amino - 3' - methyl - 4' - chloro - 2 - trifluoromethyl-1,1'-diphenylether, 4-amino-2'4'-dichloro -2- trifluoromethyl -1,1'- diphenylether etc. with phosgene the carbamic acid chlorides are formed. By suitable reactions known per se the latter which are obtained from the correponding primary amines are easily transformed into the isocyanic acid esters.

Disguised isocyanates i. e. substances which generate isocyanate as for example water soluble adducts of isocyanate and bisulfite and the like react in a similar manner.

By reaction of alcohols, e. g. methylol, ethylol, benzylalcohol or phenols as halogen substituted phenols or trifluoromethylphenol, nitrophenol and the like, with phosgene in the presence of tertiary bases one obtains the reactive chlorocarbonic acid esters. On the other hand isothiocyanates may be produced by known processes from amines.

The products obtained by transposition of thiocyanicacid esters have proved to be of special value and availability. Benzylhalogenide and nuclearly halogenated benzylhalogenides but also saturated or unsaturated alkylhalides are suitable starting materials.

Further acylating agents for the aromatic or heterocyclic aminosulphonic acids are the cyanuric acid or their reactive derivatives or products reacting like these. Examples therefor are cyanuric chloride, cyanuric bromide, thioalkyltriazine derivatives, chlorodiaminotriazine etc. Thereby the aromatic or heterocyclic aminosulphonic acids may react with the reactive triazine derivatives one but preferably twice whereby the remaining last reactive member of the triazine radical may remain as such or may be reacted with compounds containing a hydrogen atom capable of reaction, such as ammonia, amines, alcohols or alcoholates or enolates and anorganic alkalies or mercaptanes. The sequence of the introduction of all these reactants is insignificant for the efficacy of said products of condensation, provided that they contain a trifluoromethyl-group, a sulphonic acid group, and a diphenyl-radical or a diphenyloxide-, diphenylsulphide-, diphenylsulfonide-, diphenylsulphone-, diphenylmethane-, diphenyl-carbamide- or a stilbene radical, respectively. If the products are insoluble or difficultly soluble in water they may be made water-soluble by sulphonation. These novel products of condensation are obtained by know processes see for example Chem. Zentralblatt 1925 II S. 775-781. As fixing agents for the hydrohalides one may use sodium acetate, alkalicarbonate or alkalialcoholate.

All these watersoluble acylated condensation products contain no auxochromic groups or substituents which would impart any colour to the compound.

By subsequent halogenation in manner known per se they may be transformed into halogenated or higher halogenated acylated compounds.

Suitable aromatic or heterocyclic amino-sulfonic acids are the sulfonic acids of the aminodiphenyls, the aminodiphenylethers, the aminodiphenylsulphides, the amino-diphenylsulphoxides, the aminodiphenylsulphones, the aminodiphenylurethanes, the aminodiphenylcarbamides or aminodiphenylstilbenes, or the aminodiphenylthiocarbamides, the aminodiphenylketones, the aniline, anisidine, halogenated anilines and the like. Especially suited are alkyl- and/or halogensubstituted derivatives of the above mentioned aminosulphonic acids, like benzidine monosulphonic acid, 4-methyl-2'-amino-1,1-diphenylether - 4' - sulphonic acid, 4 - methyl - 4'-amino-1,1'-diphenylether-2'-sulphonic acid, 2-amino-1,1'-diphenylether-2'- or 4'-sulphonic acid, 3,4-dimethyl-4'-amino-1,1'-diphenylether-2'-sulphonic acid, 4-methyl- or 3,4-dimethyl-2'-amino-1,1'-diphenylsulphide-4'-sulphonic acid, 4 - methyl- or 3,4 - dimethyl - 2' - amino - 1,1'-diphenylsulphoxide - 4 - sulphonic acid, 3,4 - dimethyl - 4' - amino - 1,1' - diphenylsulphone-2'-sulphonic acid, 4-amino-4'-tert. amyl-1,1'-diphenylether-2-sulphonic acid, 4-amino-3', 5'-dimethyl - 1,1' - diphenylether - 2 - sulphonic acid, 3' - methyl - 4 - amino - 1,1' - diphenylether - 2-sulphonic acid, 4-amino-1,1'-diphenylether-2'-sulphonic acid, 3-trifluoromethyl-2'-amino-1,1'-diphenylether - 4' - sulphonic acid, 3 - trifluoromethyl - 4' - amino - 1,1' - diphenylether - 2-sulphonic acid, 4-trifluoromethyl-4'-methyl-2-amino - 1,1' - diphenylether - 2' - sulphonic acid, 4-trifluoromethyl-4'-tert. amyl-2-amino-1,1'-diphenylether-2'-sulphonic acid, 4-trifluoromethyl-4'-butyl-2-amino-1,1-diphenylether-2'-sulphonic acid, 4-trifluoromethyl-4'-chloro-2-amino-1,1'-diphenylether - 2' - sulphonic acid, 4 - trifluoromethyl - 4' - methoxy - 2 - amino - 1,1' - diphenylether-2'-sulphonic acid, 4-amino-2-trifluoromethyl - 4' - methyl - 1,1' - diphenylether-2'-sulphonic acid, 4-amino-2-trifluoromethyl-4'-chloro-1,1'-diphenylether-2'-sulphonic acid, 4,4'-dichloro - 2 - amino - 1,1' - diphenylether - 2'-sulphonic acid, 4-chloro-4'-amino-1,1'-diphenylether-2'-sulphonic acid, 4,2'-dichloro-4'-amino-1,1'-diphenylether-2-sulphonic acid, 4-trifluoromethyl - 3',4' - dichloro - 2 - amino - 1,1' - diphenylether-2'-sulphonic acid, 4,4',5'-trichloro--2-amino-1,1'-diphenylether-2'-sulphonic acid, 3 - methyl - 4 - chloro - 4' - amino - 1,1' - diphenylether-2'-sulphonic acid, 3,4-dichloro-4'-amino-1,1'-diphenylsulphide-2'-sulphonic acid, 3,4 - dichloro - 2' - amino - 1,1' - diphenylether- 4' - sulphonic acid, 4 - chloro - 4' - amino - 1,1'-diphenyl-sulphoxide-2'-sulphonic acid, 4-chloro-4'-amino-1,1'-diphenylsulphone - 2' - sulphonic acid, 4,4' - dichloro - 2 - amino - 1,1' - diphenylmethane-2'-sulphonic acid, 3'-aminobenzoyl-3,4-dichloroanilide-6-sulphonic acid, amino-stilbenedisulphonic acid etc. Examples for the class of heterocyclic aminosulphonic acids are aminobenzothiazol-sulphonic acid, 3 - amino - phenothioxine-x-sulphonic acid, 4-chloro-3'-amino-diphenyleneoxide-x-sulphonic acid. The aromatic halogen substituted aminosulphonic acids of the benzene series which may be condensed with the carbonic acid derivatives of the aminodiphenylethers or aminodiphenylsulphides are for example: 4-chloroaniline-6-sulphonicacid, 4-bromoaniline-6-sulphonic acid, 3,4-dichloroaniline-6-sulphonic acid, 2,6-dichloroaniline-4-sulphonic acid, 2-chloroaniline-4-sulphonic acid, 2-chloro-4-toluidine-5-sulphonic acid, 1-amino-3-trifluoromethylbenzene-4-sulphonic acid, 1-amino-4-trifluoromethylbenzene-2-sulphonic acid, 1-amino-4 - trifluoromethylbenzene - 2 - sulphonic acid, 1 - amino - 2 - trifluoromethylbenzene - 4 - sulphonic acid, 1-amino-2-chloro-5-trifluoromethylbenzene-4-sulphonic acid, 1-amino-2,4-dichloro-3 - trifluoromethylbenzene - 6 - sulphonic acid, 1 - amino - 2,5 - dichloro - 3 - trifluoromethylbenzene-4-sulphonic acid, 1-amino-2-bromo-5-trifluoromethylbenzene - 4 - sulphonic acid, 1-amino - 4 - chloro - 2 - trifluoromethylbenzene-6-sulphonic acid, 1-amino-4-chloro-3-trifluoromethylbenzene - 6 - sulphonic acid, 1 - amino-2-methoxy - 5 - trifluoromethylbenzene - 4 - sulphonic acid, 1 - amino - 4-methoxy - 5 - trifluoromethylbenzene-2-sulphonic acid, 1-amino-2 - ethoxy - 5 - trifluoromethylbenzene - 4 - sulphonic acid, 1-amino-3,5-bis-trifluoromethylbenzene - 4 - sulphonic acid, 1 - amino - 3 - trifluoromethylbenzene - 4 - methylsulphone - 6-sulphonic acid and the like.

If the substituents are properly chosen one may build up products with one or more sulphonic acid groups. If for example phosgene, thiophosgene or carbondisulphide are reacted with aminodiphenylether sulphonic acids containing trifluoromethyl groups, carbamides or thiocarbamides with two sulphonic acid groups are formed. On the other hand the reaction between the cited carbamic acid chlorides and aminosulphonic acids gives carbamides with one sulphonic acid group. The trifluoromethyl group may be in one or both of the reacting components. Similarly in the condensation with cyanurchloride it is possible to obtain symmetric or asymmetric condensation products having one or more sulphonic acid groups by choosing suitable components. In this case the products containing two molecules of aminodiphenylethersulphonic acids are of special importance.

It is known from the U. S. Patent No. 2,363,042 to condense 3,4-dichloroaniline-6-sulphonic acid with halogensubstituted aromatic carbamic acid derivatives. These compounds did not find industrial use and their efficacy is inferior to the product containing trifluoromethyl groups.

The acylated aminoarylsulphonic acids mentioned above are extremely suited for protecting of wool, feathers, furs, hairs, paper, textiles, leather, natural or synthetic fibers or articles containing said products against moths and other textile pests. Of special interest is their pronounced wash- and fulling-proofness. By suitable substitution they may also be useful as disinfectants, as bactericides, fungicides and insecticides, as excellent mercury-free seed preserving agents and as textile adjuvants.

Example 1

1 mol 4-methyl-4'-trifluoromethyl-2'-amino-1,1'-diphenylether-2-sulphonic acid, prepared by condensation of 1-chloro-2-nitro-4-trifluoromethylbenzene and p-cresol, sulphonation and reduction of the product of condensation is suspended in dry pyridine. To this suspension is added drop by drop a molecular amount of palmkerneloil fatty acid chloride (mol. w. 220) while stirring at a temperature of 20°–35° C. until a sample contains no free amino acid. The mixture is then made alkaline with sodium carbonate, the pyridine blown off with steam and the remaining solution acidified with hydrochloric acid after having been cooled. The precipitated mass is washed with petrol-ether to remove an excess of palmkerneloil fatty acid, whereby the 4-methyl-4'-trifluoromethyl-2'-laurolyamino-1,1'-diphenylether-2-sulphonic-acid of the following formula is obtained in a pure state:

(1) 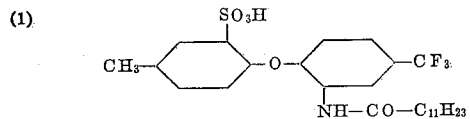

Instead of the 4-methyl-4'-trifluoromethyl-2'-amino-1,1'-diphenylether-2-sulphonic acid one may use the 4-tert. amyl-4'-trifluoromethyl-2'-amino-1,1'-diphenylether-2-sulphonic acid, the 4-methoxy-4'-trifluoromethyl-2'-amino-1,1'-diphenylether-2-sulphonic-acid, the 4-chloro-4'-trifluoromethyl-2'-amino-1,1'-diphenylether-2-sulphonic acid, the 4-butyl-4'-trifluoromethyl-2'-amino-1,1'-diphenylether-2-sulphonic acid, the 4-chloro-5-methyl-4'-trifluoromethyl-2'-amino-1,1'-diphenylether-2-sulphonic acid, the 4,6-dichloro-4'-trifluoromethyl-2'-amino-1,1'-diphenylether-2-sulphonic acid, the 4-tert. amyl-6-chloro-4'-trifluoromethyl-2'-amino-1,1'-diphenylether-2-sulphonic acid, the 4,5-dichloro-4'-trifluoromethyl-2'-amino-1,1'-diphenylether-2-sulphonic acid, the 4-chloro-4'-amino-2'-trifluoromethyl-1,1'-diphenylether-2-sulphonic acid, the 4-methyl-4'-amino-2'-trifluoromethyl-1,1'-diphenylether-2-sulphonic acid, the 4-chloro-5-methyl-4'-amino-2'-trifluoromethyl-1,1'-diphenylether-2-sulphonic acid. These amino-trifluoromethyl-diphenylether-sulphonic acids are prepared by known methods from phenols and 1-chloro-2-nitro-4-trifluoromethylbenzene or 1-chloro-2-trifluoromethyl-4-nitrobenzene, whereby the first formed nitrodiphenylether is sulphonated and reduced.

Example 2 a. Molecular amounts of 4-chloro-4'-trifluoromethyl-2'-amino-1,1'-diphenylether-2-sulphonic acid, prepared by condensation of p-chlorophenol with 1-chloro-2-nitro-4-trifluoromethylbenzene, sulphonation and reduction of the product of condensation are dissolved in water with addition of a 10% sodium carbonate solution and stirred 5 hours at 20°–25° C. with 3,4-dichloro-benzoylchloride whereupon no free amino group is detectable. The weakly alkaline solution is cooled and mixed with brine, whereby the product of condensation is precipitated in resinous form. It is separated and dried in a vacuum to obtain a bright water soluble powder. It has the following formula (2) 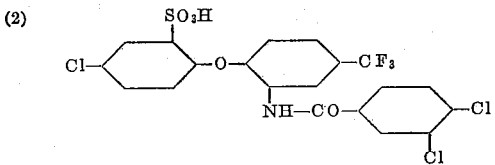

Instead of 3,4-dichlorobenzoylchloride one may also use 2,4-dichlorobenzoylchloride or 2,5-dichlorobenzoylchloride.

b. By condensation of 4-tert. amyl-4'-trifluoromethyl-2'-amino-1,1'-diphenylether-2-sulphonic acid with 3,4-dichlorobenzoyl-chloride the following compound is obtained:

(3) 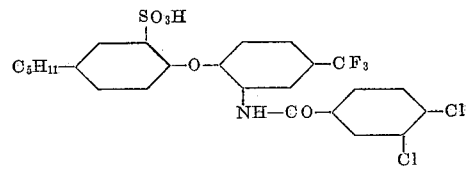

Example 3

Molecular amounts of 4-amino-4'-methyl-1,1'-diphenylether-2-sulphonic acids and 3-trifluoromethyl-benzoylchloride are subjected to the reaction of Schotten-Baumann. The weakly alkaline solution is mixed with a sodium chloride solution to precipitate the product of condensation. The latter is dried in a vacuum and extracted with absolute alcohol. After evaporation of the alcohol a brittle mass, which is readily pulverised is obtained; it is soluble in water. The product has the formula (4) 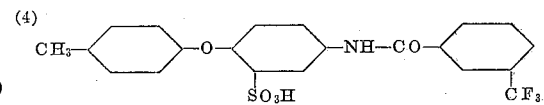

Instead of 4-amino-4'-methyl-1,1'-diphenylether-2-sulphonic acid one may use other aminodiphenylethersulphonic acids as for example: 4-amino-4'-chloro-5'-methyl-1,1'-diphenylether-2-sulphonic acid, 4-amino-4'-tert. amyl-6'-chloro-1,1'-diphenylether-2-sulphonic acid, 4-amino-2',4',5'-trichloro-1,1'-diphenylether-2-sulphonic acid, 2-amino-4',5-dichloro-1,1'-diphenylether-4-sulphonic acid, 2-amino-4',5-dichloro-5'-methyl-1,1'-diphenylether-4-sulphonic acid, 4-amino-2'-chloro-1,1'-diphenylether-2-sulphonic acid, 4-amino-4',6'-dichloro-1,1'-diphenylether-2-sulphonic acid, 2-amino-4',6'-dichloro-1,1'-diphenylether-4-sulphonic acid, 4-amino-4'-chloro-1,1'-diphenylether-2-sulphonic acid, 2-amino-4'-chloro-1,1'-diphenylether-4-sulphonic acid, 2-amino-4'-chloro-5'-methyl-1,1'-diphenylether-4-sulphonic acid, 4-amino-4',5'-dichloro-1,1'-diphenylether-2-sulphonic acid, 4-amino-4'-chloro-3',5'-dimethyl-1,1'-diphenylether-2-sulphonic acid, 2-amino-4'-chloro-3',5'-dimethyl-1,1'-diphenylether-4-sulphonic acid, 4-amino-4'-chloro-3'-methyl-6'-isopropyl-1,1'-diphenylether-2-sulphonic acid, 2-amino-4'-amyl-6'-chloro-1,1'-diphenylether-4-sulphonic acid, 4-amino-2'-methyl-5'-isopropyl-1,1'-diphenylether-2-sulphonic acid etc.

The diphenylether sulphonic acids are prepared in a manner known per se by condensation of o- or p-chloronitrobenzenesulphonic acid with the corresponding phenols and subsequent reduction.

Example 4

1/20 mol sodiumsalt of 4-chloro-4'-trifluoromethyl - 2'-amino-1,1'-diphenylether sulphonic acid is dissolved in water and the solution cooled to 10° C. The 4-chlorophenylacetochloride is added drop by drop in an amount slightly exceeding the calculated amount and stirred without cooling until a sample shows no diazoreaction. If desired a little more of the acylating agent is added. The reaction mixture is then neutralised with sodium carbonate and the product of condensation is precipitated with sodium chloride solution. It forms a resinous mass which is dried in a vacuum. Thereafter the product may be easily pulverised and is soluble in water. It has the following formula:

(5)
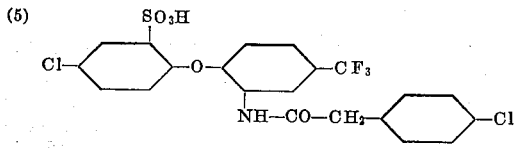

Instead of 4-chlorophenylacetochloride one may use the reactive derivatives of cinnamic acid as 4-chloro-cinnamic acid chloride, 2-chloro-cinnamic acid chloride, 4-methoxy-cinnamic acid chloride.

Instead of 4 - chloro - 4'-trifluoromethyl-2'-amino-1,1'-diphenylether-2-sulphonic acid, one may use other diphenylether sulphonic acids containing trifluoromethyl - groups, for example those mentioned in Example 1.

*Example 5*

1/20 mol 4-chloro-4'-trifluoromethyl-2'-amino-1,1'-diphenylether-2-sulphonic acid is dissolved in 150 parts by volume of anhydrous pyridine. To this solution is added under vigorous stirring slightly more than 1/20 mol succinic-acid dichloride in small portions. The temperature is held 1 hour at 5°–10° C. and then for a further hour at 20°–25° C. Then the pyridine is blown off with steam, the solution treated with sodium carbonate, filtered and mixed with brine. The condensation product precipitates in crystalline form. It is filtered by suction, washed with a little amount of salt water and dried. It has the following formula:

(6)
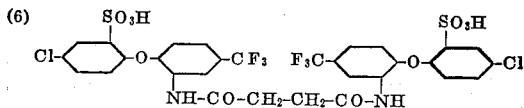

Instead of succinic acid chloride one may use diethylmalonic acid dichloride, glutaric acid dichloride, adipic acid dichloride and terephthalic acid dichloride.

*Example 6*

5 - methyl - 4' - trifluoromethyl - 2' - amino-1,1' - diphenylether - 2 - sulphonic acid obtained by condensation of m-cresol with 1-chloro-2-nitro-4-trifluoromethylbenzene and subsequent sulphonation and reduction is reacted in pyridine with palmkernelfatty acid chloride in a manner known per se. 1/20 mol of this product of condensation is dissolved in 200 parts by volume of water with the calculated amount of sodium carbonate. Chlorine is introduced into this solution having regard that the reaction of the solution is held always slightly alkaline by adding dropwise sodium hydroxide solution. After about 2 hours the halogenated compound is precipitated with hydrochloric acid, extracted with ether, washed and dried. When the ether is distilled off a pasty residue remains. In form of its sodium salt the new compound is a bright powder which is readily soluble in water and gives foaming solutions. It has probably the following constitution:

(7)
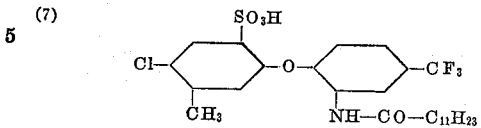

*Example 7*

24 parts 3,4-dichloroaniline-6-sulphonic-acid are suspended in 100 parts pyridine, then mixed at 20° C. with 3-trifluoromethyl-1,1'-diphenylether-4'-carboxylic acid chloride (prepared in the usual manner from 3-trifluoromethyl-1,1'-diphenylether-4-carboxylic acid and thionylchloride). The mixture is stirred 12 hours at room temperature. Then the mixture is distilled with steam, treated with sodium bicarbonate, taken up in a sufficient amount of hot water and filtered while hot.

Upon cooling and addition of a little amount of salt the product of condensation precipitates in crystalline form. It is filtered by means of suction and dried in vacuum. It has the following formula:

(8)
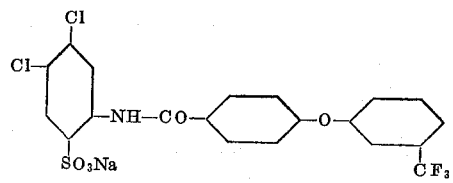

Instead of 3,4-dichloroaniline-6-sulphonic acid one may use 3,4-dimethylaniline-6-sulphonic acid or 4-chloroaniline-6-sulphonic acid or metanilic acid. The 3-fluoromethyl-1,1'-diphenylether-4'-carboxylic acid is obtained by hydrolysation of 3-trifluoromethyl-4-cyano-1,1'-diphenylether. The latter is prepared by known methods from diazotised 3 - trifluoromethyl-4'-amino-1,1'-diphenylether.

*Example 8*

1/10 mol 3-trifluoroaniline-6-sulphonic acid are dispersed in 150 parts by vol. pyridine and stirred with 1/10 mol 4-chloro-1,1'-diphenylether-4'-carboxylic acid chloride at room temperature for a period of 10 hours. Then the mixture is distilled with steam treated with sodium bicarbonate solution cooked with hot water and filtered. The product of condensation separates from the hot filtrate in crystalline form. It is filtered and dried in vacuum. Its formula is as follows:

(9)
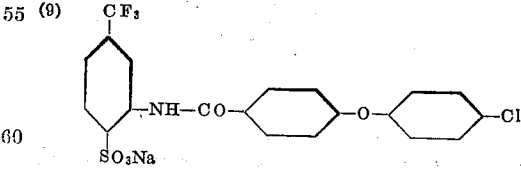

Instead of 3-fluoromethyl-6-aniline-sulphonic acid one may use 4-chloro-3-trifluoromethylaniline-6-sulphonic acid. Instead of 4-chloro-1,1'-diphenylether-4'-carboxylic acid chlorides one may use 2',4-dichloro-1,1'-diphenylether-4'-carboxylic acid chloride, 2,4-dichloro-1,1'-diphenylether-4'-carboxylic acid chloride, 3-methyl-4-chloro - 1,1' - diphenylether - 4' - carboxylic acid chloride or -bromide, 4,4' - dichloro - 1,1'-diphenylether - 2 - carboxylic acid chloride, 3,4'-dichloro - 1,1' - diphenylether - 4 - carboxylic-acid chloride, 4 - bromo - 1,1' - diphenylether-4'-carboxylic acid chloride, diphenylether-4-carboxylic acid chloride, 4-methoxy-1,1'-diphenylether-4'-carboxylic acid chloride, diphenylenoxide-3-carboxylic acid chloride, 4'-chloro-1,1'-diphenylsulphide-4-carboxylic acid chloride, 3,3'-dichloro-1,1'-diphenylsulphide-4-carboxylic acid chloride, 3',4'-dichloro-1,1'-diphenylsulphide-4-carboxylic acid chloride. In place of the carboxylic-acid chlorides other acid derivatives capable of reaction may be used.

Example 9

1/10 mol 3-trifluoromethylaniline-6-sulphonic acid are suspended in 150 parts by volume of pyridine mixed with 1/10 mol 4-chloro-1,1'-diphenylether-4-sulphochloride and stirred several hours at 90° C. Then the pyridine is blown off with steam. Upon cooling the product of condensation separates in crystalline form. It has the following formula:

(10)
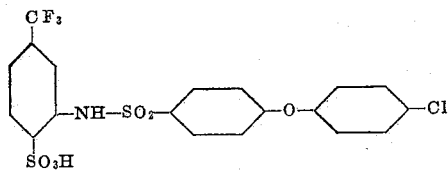

Instead of trifluoromethylaniline-6-sulphonic acid one may use 4-chloro-3-trifluoromethylaniline-6-sulphonic acid. Instead of 4-chloro-1,1'-diphenylether-4'-sulphochloride one may use the diphenylether-4-sulphochloride, 2'-chloro-1,1'-diphenylether - 4 - sulphochloride, 2',4 - dichloro-1,1'-diphenylether-4'-sulphochloride or 4'-chloro - 3' - methyl - 1,1' - diphenylether - 4 - sulphochloride.

Example 10 a. Molecular amounts of 4-chloro-4'-trifluoromethyl - 2' - amino - 1,1'-diphenylether-2-sulphonic acid and 1-trifluoromethyl-2-chlorobenzene-5-sulphochloride are condensed in aqueous medium with addition of 10% sodium carbonate. At the beginning the temperature is held for 5 hours at 20–25° C., then at 50–60° C. until no free amino group is longer detectable. If necessary some more sulphochloride is added. The weakly alkaline solution is cooled, whereupon the product of condensation precipitates. It has the following constitution:

(11)
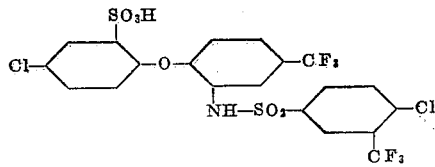

It is also possible to react another diphenylether- or diphenylsulphide sulphonic acid.

b. With 4', 4-dichloro-2-amino-1,1'-diphenylether-2'-sulphonic acid and 1-trifluoromethyl-2-chlorobenzene-5-sulphonic acid for example the product of the following formula is obtained.

(12)
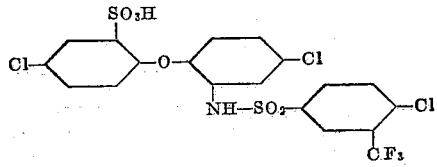

c. With 4 - methyl - 4'-amino-1,1'-diphenylether-2'-sulphonic acid and 1-trifluoromethylbenzene-3-sulphochloride the following product is obtained.

(13)
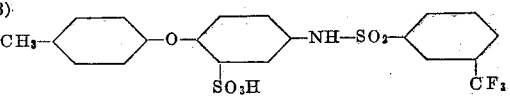

Other aminodiphenylethersulphonic acids may also be used.

Example 11

18 parts 4 - methyl - 4' - trifluoromethyl - 2'-amino-1,1'-diphenylether-2-sulphonic acid are dissolved in water with the necessary amount of 10% sodium carbonate. To this solution are given 35 parts of crystallised sodium acetate and then phosgene at 40°–50° C. is fed into this solution until no free amine can be detected in a sample. The solution is then neutralised, whereupon the N,N'-2,2'-(4'',4'''-dimethyl-2'', 2'''-disulpho-diphenoxy) - 5,5' - di-trifluoromethyl-diphenylcarbamide separates out in form of a paste. This is isolated and dried to obtain a water soluble powder, corresponding to the following formula:

(14)
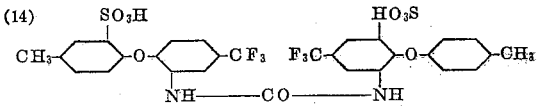

Instead of phosgene one may also use substances which deliver phosgene, like pyridine chlorocarbonyl (Fridl. 6 1162) perchloromethylformiat, hexachlorodimethylcarbonate or other similar substances. Instead of 4-methyl-4'-trifluoromethyl - 2' - amino-1,1'-diphenylether-2-sulphonic acid one may use other diphenylethersulphonic acids containing trifluoromethyl groups, for example those mentioned in Example 1.

Example 12

45 parts 4-chloro-4'-trifluoromethyl-2'-amino-1,1'-diphenylether dissolved in 50 parts by volume of alcohol are mixed with 50 parts by volume of carbon disulphide and 0.3 part by weight sulphur and heated during 6 hours with reflux, hydrogen sulphide escapes in great amounts. The so formed N,N'-2,2'-(4'', 4'''-dichloro - diphenoxy) - 5,5'-di-trifluoromethyl-diphenyl-thiocarbamide is filtered by suction and washed with a little amount of alcohol.

40 parts of this thiocarbamide are dissolved in 200 parts of sulphuric acid monohydrate at a temperature of 10° C., then slowly heated to 20° C. until a sample has become water soluble with sodium carbonate. The sulphonated mass is poured on ice and salted out. The N,N'-2,2'-(4'', 4'''-dichloro-2'', 2'''-disulpho-diphenoxy)-5,5' - ditrifluoromethyl) - diphenyl - thiocarbamide has the formula:

(15)
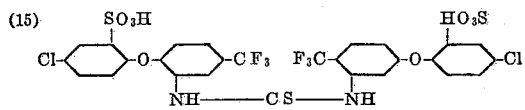

Example 13

1/10 mol 4-amino-4'-chloro-1,1'-diphenylether and the corresponding molar amount of 3-trifluoromethylphenylisocyanate (Ann. 562 p. 90, 1949) are thoroughly mixed and heated to 120° C. At this temperature the reaction starts and the temperature raises up to 150° C. The mixture is then heated for further three hours at a temperature of 160–165° C. and then cooled. The reaction may also be accomplished in a suitable solvent like acetone, anisol etc. Thereby the carbamide is formed in substantially theoretical yields. 40 parts of this N'-4'-(4''-chlorophenoxy) - phenyl - N - 3-trifluoromethylphenyl-carbamide are added to 200 parts by weight of sulphuric acid monohydrate at 10° C. and cooled to —10° C. At this temperature 35 parts by weight of 25% oleum are added drop by drop while vigorously stirring. The stirring is continued until a sample is soluble in diluted alkali. The mixture is then poured on ice, the acid neutralised and the product precipitated with salt. 40 parts of a watersoluble product are obtained, which is probably N'-4'-(2''-sulpho-4''-chlorophenoxy) - phenyl - N-3-trifluoromethylphenyl-carbamide with the following formula:

(16) 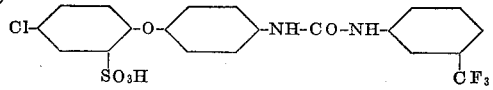

*Example 14* a. 23 parts 4-amyl-4'-amino-1,1'-diphenyl-ether-2'-sulphonic acid are dissolved in 150 parts by volume of anhydrous pyridine. To this solution is given the calculated quantity of 3-trifluoromethyl-phenyl-carbamic acid chloride at a temperature of 10°–15° C. while stirring, whereupon stirring is continued for an hour at 40–50° C. The mixture is treated with 100 parts of 10% sodium carbonate and treated with steam until the pryidine is distilled off. Upon cooling a resinous product separates from the aqueous solution and is collected and dissolved in 500 parts of hot water. The solution is filtered while hot and the N'-4'-(4'' - amylphenoxy) - 2'-sulphophenyl-N -3 - trifluoromethyl - phenyl - carbamide precipitated as a resin with a small amount of brine. It is separated from the aqueous layer, dried in a vacuum whereupon it solidifies into a glassy mass. The yield is quantitative and the product corresponds to the following formula:

(17) 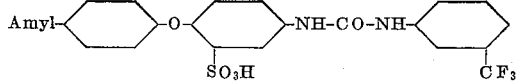

b. Instead of 4-amyl-4'-amino-1,1'-diphenyl-ether-2'-sulphonic acid one may use other aminodiphenylether sulphonic acids for example those mentioned in Examples 1 and 3. So one obtains from 2-amino-4,4'-dichloro-1,1'-diphenylether-2'-sulphonic acid and 3-trifluoromethyl-phenylcarbamic acid chloride the N'-2'-(4''-chloro-2''-sulphophenoxy)-5' - chlorophenyl-N-trifluoromethyl-phenylcarbamide of the formula:

(18) 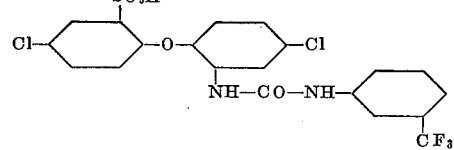

c. Instead of the 3-trifluoromethylphenyl-carbamic acid chloride one may use for example 3-trifluoromethyl-4-chlorophenyl-carbamic acid chloride, 3-trifluoromethyl - 6-chlorophenyl-carbamic acid chloride, 4-trifluoromethylphenyl-carbamic acid chlorides 2-trifluoromethylmethyl-phenyl-carbamic acid chloride or 3,5-bis-trifluoromethylphenyl-carbamic acid chloride. By condensation of 2-amino-4,4'-dichloro-1,1'-diphenylether-2'-sulphonic acid with 3-trifluoromethyl-4-chlorophenyl-carbamic acid chloride the N' - 2' -(4''-chloro - 2''-sulphophenoxy) - 5'-chlorophenyl - N-3-trifloromethyl-4-chlorophenyl-carbamide of the following formula is formed:

(19) 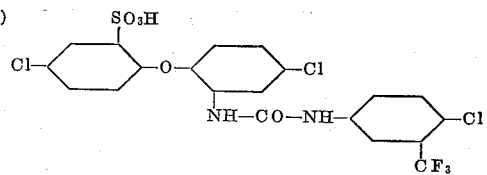

*Example 15* a. 1/20 mol of 4-chloro-4'-trifluoromethyl-2'-amino-1,1'-diphenylether-2-sulphonic acid (see Example 1) are dissolved in anhydrous pyridine and mixed with 1/20 mol of 3,4-dichlorophenyl-isocyanate while stirring at 10–15° C. After one hour the diazoreaction has disappeared, whereupon the pyridine is blown off with steam. After addition of a small amount of sodiumchloride solution the N'-2' -(4'' - chloro - 2''-sulphophenoxy) -5'-trifluoromethylphenyl - N-3,4-dichloro-phenylcarbamide is precipitated from the hot solution. It corresponds to the following formula:

(20) 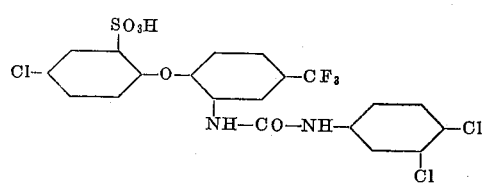

In place of 3,4-dichlorophenyl-isocyanate one may use 4 - chlorophenylisocyanate, 2-chlorophenylisocyanate, 3,4,5 - trichlorophenylisocyanate, 3-trifluoromethylisocyanate, 3 - trifluoromethyl-4-chlorophenyl-isocyanate, 2,5-dichlorophenyl-isocyanate, 2,4 - dichlorophenyl - isocyanate, 2,4,5-trichlorophenyl-isocyanate, 2-methoxy-4-methyl-5-chlorophenyl-isocyanate, 3,4-dimethylphenyl-isocyanate or 2,4-dimethylphenyl-isocyanate. Instead of 4-chloro - 4' - trifluoromethyl-2'-amino -1,1'-diphenylether-2-sulphonic acid other aminodiphenylether sulphonic acids containing trifluoromethyl-groups, as specified in Example 1, may be used.

b. From 4-methyl-4'-trifluoromethyl - 2'-amino-1,1'-diphenylether-2-sulphonic acid and 3-trifluoromethylphenylisocyanate the N'-2'-(4''-methyl-2''-sulphophenoxy)- 5' - trifluoromethyl-phenyl - N-3 -trifluoromethylphenylcarbamide is obtained, which corresponds to the following formula:

(21) 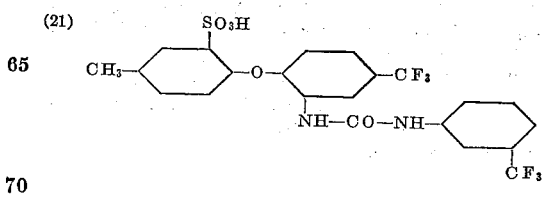

c. Or from 4-tert. amyl-4'-trifluoromethyl-2'-amino-1,1'-diphenylether-2-sulphonic acid and 3-trifluoromethylphenyl-isocyanate, the N' - 2'-(4''-tert. amyl - 2''-sulphophenoxy) -5'-trifluoro-methylphenyl - N-3 - trifluoromethylphenylcarbamide is obtained which corresponds to the following formula:

(22)
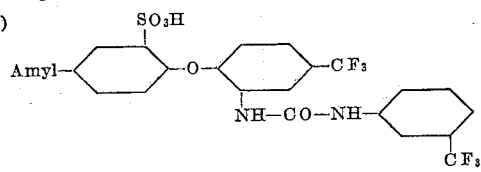

Example 16

15 parts 3,4-dimethylaniline-6-sulphonic acid are dissolved in 100 parts dry pyridine. To this solution the equivalent amount of 3-trifluoromethyl-6-(4'-tert. amylphenoxy)-phenylcarbamic acid chloride, prepared from 4-trifluoromethyl-4'-amyl-2-amino-1,1'-diphenylether and phosgene in a manner known per se, is added slowly while stirring at a temperature of 5°–10° C. Then stirring is continued for a further hour at 40–50° C. whereupon the solution is treated with aqueous bicarbonate solution and the pyridine blown off with steam. The residue is taken up in hot water, filtered and the clear filtrate admixed with brine in order to separate N-3,4-dimethyl-6-sulphophenyl-N'-2'-(4''-tert. amylphenoxy)-5'-trifluoromethylphenylcarbamide. It is dried in a vacuum and forms a brittle mass, which when pulverised is soluble in warm water. The carbamide has the following formula:

(23)
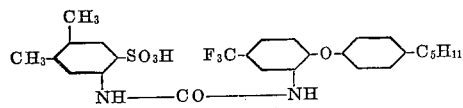

Example 17 a. To an aqueous emulsion of 1/16 mol 4,4'-dichloro-2'-sulpho-1,1'-diphenylether-2-0-phenyl-urethane the calculated amount plus 10% excess 3-trifluoromethyl-4-chloroaniline are added and heated several hours on the boiling waterbath. The unreacted 3-trifluoromethyl-4-chloroaniline is then distilled off with steam, the residue saturated with sodium chloride, the aqueous solution separated from the precipitated oil. The latter is dissolved in a small amount of water, whereby the mixed carbamide becomes gradually crystalline. The product is filtered by suction and dried. The N'-2'-(4''-chloro-2''-sulphophenoxy)-5'-chlorophenyl-N-3-trifluoromethyl-4-chlorophenyl-carbamide is obtained in good yields. Its composition and properties correspond to the product obtained according to Example 14c.

(24)
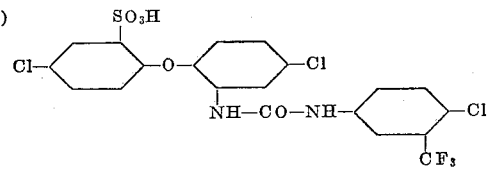

b. By corresponding reaction of 4-chloro-4'-trifluoromethyl-2-sulpho-1,1'-diphenylether-2'-O-phenylurethane with 3,4-dichloroaniline the N'-2'-(4''-chloro-2''-sulphophenoxy)-5'-trifluoromethylphenyl-N-3,4-dichlorophenyl-carbamide corresponding to the product of Example 15a is obtained.

(25)
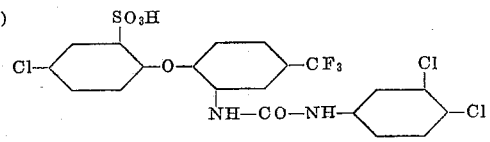

c. Reaction of 4,4'-dichloro-2'-sulpho-1,1'-diphenylether-2-O-phenylurethane with 4-trifluoromethylaniline gives N9-2'-(4''-chloro-2''-sulphophenoxy)-5'-chlorophenyl-N-4-trifluoromethyl-phenylcarbamide:

(26)
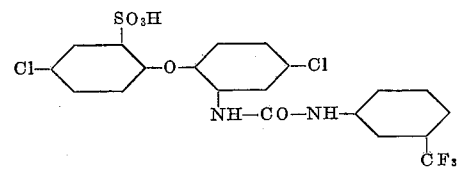

d. Reaction of 3',4'-dichloro-2-sulpho-1,1'-diphenylsulphide-4-O-phenylurethane with 3-trifluoromethylaniline produces N'-4'-(3'',4''-dichlorophenylsulphide)-5'-sulphophenyl-N-3-trifluoromethylphenylcarbamide:

(27)
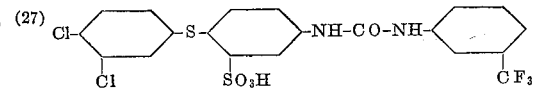

e. Reaction of 4-methyl-2'-sulpho-1,1'-diphenylether-4'-O-phenylurethane with 4-trifluoromethylaniline gives N'-4'-(4''-methylphenoxy)-5'-sulphophenyl-N-4-trifluoromethylphenyl-carbamide:

(28)
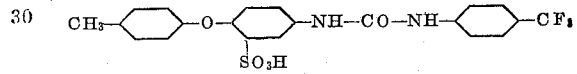

f. Reaction of 4,4'-dichloro-2'-sulpho-1,1'-diphenylmethane-2-O-phenylurethane with 3-trifluoromethyl-4-chloroaniline gives N'-2'-(4''-chloro-2''-sulphobenzyl)-5'-chlorophenyl-N-3-trifluoromethyl-4-chlorophenylcarbamide:

(29)
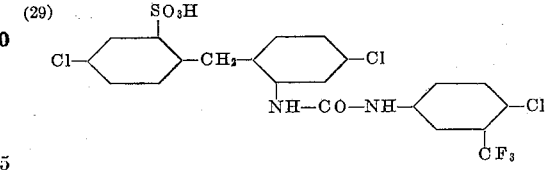

g. Reaction of 4',5'-dichloro-4-sulpho-1,1'-diphenylether-2-O-phenylurethane with 4-trifluoromethylaniline gives N'-2'-(3'',4''-dichlorophenyl)-5'-sulphophenyl-N-4-trifluoromethylphenylcarbamide:

(30)
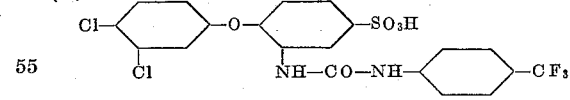

h. Reaction of 4-tert. amyl-2'-sulpho-1,1'-diphenylether-4'-O-phenylurethane with 4-trifluoromethylaniline gives N'-4'-(4''-tert. amylphenoxy)-5'-sulphophenyl-N-4-trifluoromethylphenylcarbamide:

(31)
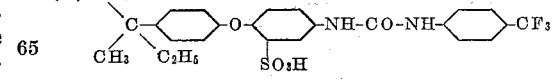

Example 18

1/20 mol dichlorobenzoylazide is dissolved in xylene and slowly heated to 40–50° C. To this solution an equimolecular amount of 4-chloro-4'-trifluoromethyl-2'-amino-1,1'-diphenylether-2-sulphonic acid is added and then slowly heated up to 90° C. while stirring. After having heated one hour at 90° C. heating is continued a further hour at 120° C. After cooling a bicarbonate solution is added and the solvent blown off with steam, then filtered while still hot. By addition of sodium chloride solution the N'-2'-(4''-chloro-2'' - sulphophenoxy)-5'-trifluoromethylphenyl-N-3,4 - dichlorophenylcarbamide is precipitated:

(32)
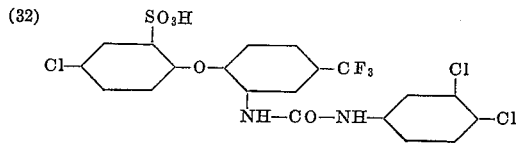

It possesses the same properties and constitution as the carbamide of Example 15a.

Example 19

1/20 mol p-chlorobenzoic acid chloroamide (prepared by introduction of an equivalent amount of chlorine in an aqueous suspension of p-chlorobenzamide at a temperature of 10–15° C. is suspended in water whereupon an equivalent amount of 4-chloro-4'-trifluoromethyl-2'-amino-1,1'-diphenylether-2-sulphonic acid is added and vigorously stirred. At the same temperature the calculated amount of 30% sodiumhydroxide is slowly added drop by drop, so that the temperature does not exceed 20° C. Upon slow stirring the paste becomes more and more consistent and the temperature rises slowly up to 30° C. and finally up to 40–45° C. When the temperature begins to fall the mixture is heated for half an hour on the water-bath to 50–60° C. After cooling the mass is shaken with ether and the aqueous part boiled with water, filtered while hot and mixed with brine. Thus the N'-2'-(4''-chloro - 2'' - sulphophenoxy)-5-trifluoromethylphenyl-N-4-chlorophenylcarbamide is precipitated.

(33)
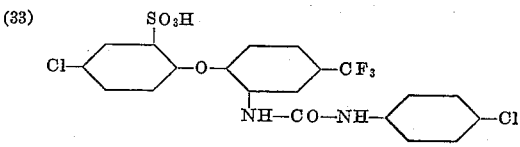

Example 20

20 gms. N'-2'-(4''-chlorophenoxy)-5'-trifluoromethylphenyl - N-3,4-dichlorophenylcarbamide (prepared by condensation of p-chlorophenolate and 4-chloro-3-nitrotrifluoromethylbenzene to form 4 - chloro-4'-trifluoromethyl-2'-nitro-1,1'-diphenylether, reduction and condensation with 3,4-dichlorophenyl-isocyanate) are dissolved in 100 gms. sulphuric acid monohydrate at a temperature of 10° C. whereupon the calculated amount of 25% oleum is slowly added at a temperature of —10° C. The mixture is stirred until a sample is soluble in diluted alkali solution. Then ice is added and the product salted out, as N' - 2' - (4''-chloro-2''-sulphophenoxy)-5'-trifluoromethylphenyl - N - 3,4-dichlorophenyl carbamide.

(34)
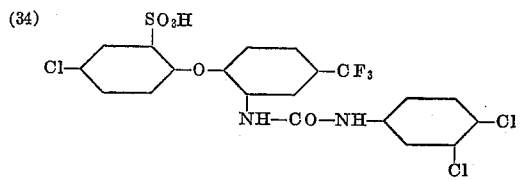

Example 21

11.87 parts by weight well dried sodium salt of 2-amino-4,4-'-dichloro-1,1'-diphenylether-2'-sulphonic acid are dissolved on the water-bath in 150 parts by volume of anhydrous acetonitrile. To this solution 10.45 parts by weight 3-trifluoromethyl - 6 - (4'-chlorophenoxy)-phenylisocyanic acid ester B. P. 0.08 mm./105–108° C. prepared from 2 - amino-4-trifluoromethyl-4'-chloro-1,1'-diphenylether by known methods, are added and heated several hours with reflux. Thereupon the mixture is boiled with bone black and filtered. The solvent is evaporated in a vacuum and the product of condensation solidifies to a brittle foamy mass. In water it gives a clear solution. Yield 20 gms. The constitution is as follows:

(35)
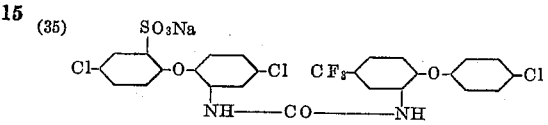

Example 22

1/30 mol of the sodium salt of 2-amino-4'-chloro - 4-trifluoromethyl-1,1'-diphenylether-2'-sulphonic acid is dissolved in 200 parts by weight of warm acetonitrile and then the calculated amount of 3-trifluoromethyl-6-(4'-chlorophenoxy)-phenyl-isocyanic acid ester is added. After having been heated three hours on the water-bath the acetonitrile is distilled off in a vacuum, whereby the remaining product of condensation solidifies with foaming. It forms clear solutions in warm water and corresponds to the following formula:

(36)
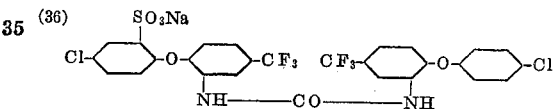

The sulphonic acid used as starting material was prepared by gentle sulphonation of 2-amino-4' - chloro - 4-trifluoromethyl-1,1'-diphenylether with oleum.

Example 23

1/25 mol of the sodium salt of 2-amino-4'-methyl - 4 - trifluoromethyl-1,1'-diphenylether-2'-sulphonic acid obtained by sulphonation of 2-nitro-4'-methyl-4-trifluoromethyl-1,1'-diphenylether with oleum and subsequent reduction according to the method of Béchamp, are dissolved in 250 parts by volume of acetonitrile and treated with an equimolecular amount of 3-trifluoromethyl-6-(p-cresoxy-)-phenylisocyanic acid ester. When the exothermic heat production ceases the mixture is heated for further 3½ hours on the water-bath with reflux whereupon the solvent is removed by vacuum distillation. The product of condensation gives clear solutions in hot water; it corresponds to the following formula:

(37)
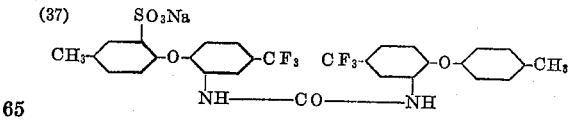

If instead of 3-trifluoromethyl-6-(p-cresoxy) - phenyl-isocyanic acid ester the 3-trifluoromethyl-6-(4-tert. amylphenoxy)-phenylisocyanicacid ester is used, the following product is obtained:

(38)
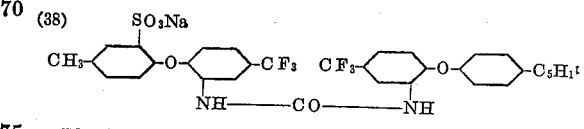

If 2-(3,5-dimethylphenoxy)-phenylisocyanate is used; the product has the following constitution:

(39) 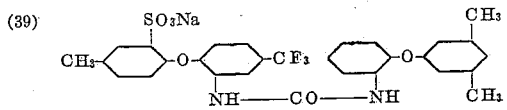

*Example 24*

1/30 mol of the sodium salt of 2-amino-4-trifluoromethyl - 4,5' - dichloro-1,1'-diphenylether-2'-sulphonic acid, prepared by gentle sulphonation of 2-amino-4-trifluoromethyl-4', 5'-dichloro-1,1'-diphenylether with oleum in monohydrate, are condensed with the equimolecular amount of 3 - trifluoromethyl-6-(3',4'-dichlorophenoxy)-phenylisocyanate in acetonitrile. After heating 4 hours on the water-bath the reaction has reached its end. The solvent is distilled off in a vacum, whereby the product of condensation remains. It gives clear solutions in hot water and corresponds to the following formula:

(40) 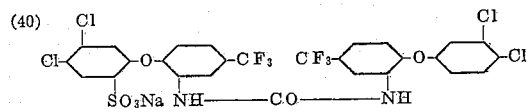

*Example 25*

By condensation of 2-amino-4'-chloro-4-trifluoromethyl-1,1'-diphenylether - 2' - sulphonic acid with 3-chloro-4-(4'-chlorophenoxy)-phenylisocyanate B. P. 0.15 mm./139° C. according to Example 22. The following assymetric carbamide is obtained:

(41) 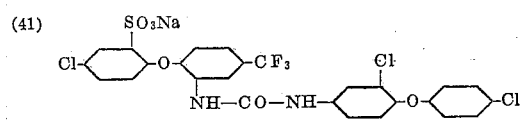

*Example 26*

If the sodium salt of 4-amino-4'-chloro-1,1'-diphenylether-2-sulphonic acid is condensed with 3-trifluoromethyl-6-(4'-chlorophenoxy) - phenylisocyanate the following water soluble product of condensation is obtained:

(42) 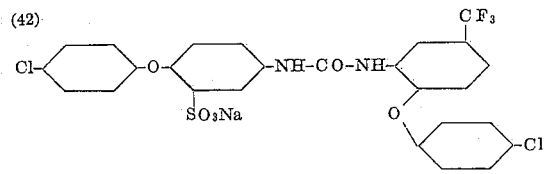

If the sodium salt of 2-amino-3', 4'-dichloro-1,1'-diphenylether-4-sulphonic acid is used instead of 4-amino-4'-chloro-1,1'-diphenylether-2-sulphonic acid, the product has the following constitution:

(43) 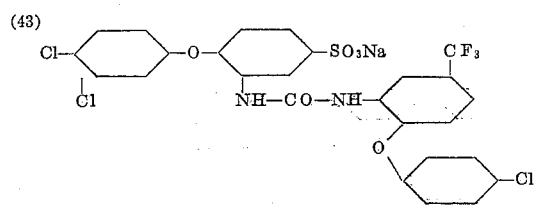

*Example 27*

1/30 mol of the sodium salt of 4-amino-3',4'-dichloro - 1,1'-diphenylsulphide-2-sulphonic acid is dissolved in hot anhydrous acetonitrile and treated with the corresponding quantity 3-trifluoromethyl-6-(3',4'-dichlorophenoxy) phenylisocyanic acid ester also dissolved in acetonitrile. When the exothermic heat production has faded the mixture is heated for further 4 hours with reflux, whereupon the solvent is distilled off in a vacuum. A condensation product corresponding to the following formula remains:

(44) 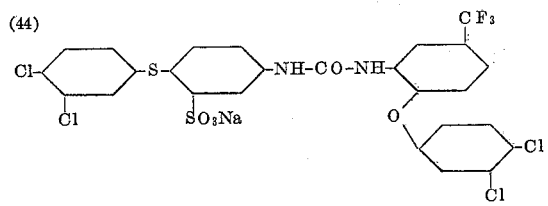

If 4 - trifluoromethyl-4'-chloro-1,1'-diphenylsulphide-2-isocyanic acid ester the following product is obtained according to Example 27:

(45) 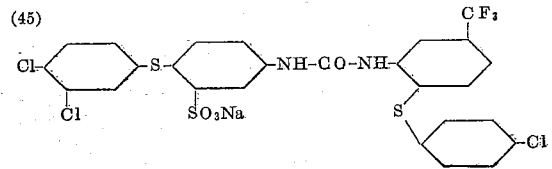

*Example 28*

The product of condensation of 2-amino-4'-chloro-4 - trifluoromethyl - 1,1' - diphenylether-2'-sulphonic acid and 4-phenoxyphenyl-isocyanate is dissolved in glacial acetic acid and chlorine is fed into this solution during one hour. The product of the chlorination is precipitated by means of water containing hydrochloric acid in form of resinous semisolid mass. The sulphonic acid is transformed into its sodium salt which forms a bright powder clearly soluble in hot water. Probably it has the following constitution:

(46) 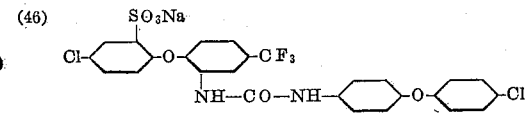

*Example 29*

To an aqueous suspension of 1/10 mol of the sodium salt of 4,4'-dichloro-2'-sulpho-1,1'-diphenylether-2-O-phenyl-urethane the calculated amount plus an excess of 10% of 2-amino-4-trifluoromethyl-4'-chloro-1,1'-diphenylether are given and heated several hours on the boiling water-bath. The mixture is then cooled and the unchanged amine extracted with ether. The aqueous parts are boiled with an addition of water, treated with bone black and filtered while still hot. By addition of sodium chloride solution the product separates in oily form. The aqueous liquor is separated from the oily product, which latter upon drying solidifies to a hard mass soluble in hot water. The properties thereof are similar to those of Example 21.

*Example 30*

9.18 parts by weight 3-trifluoromethyl-4-chloroaniline-6-sulphonic acid are dissolved in 60 parts by volume of dry pyridine and mixed with a solution of 9.3 parts by weight 3-chloro-4 - (4' - chlorophenoxy) - phenyl - 1 - isocyanate in 25 parts by volume of dry pyridine. The mixture is heated several hours with reflux in a water-bath and then let stand over night. The product is then poured into 20 parts by volume of water, then ice is added and the solution made congo-acid with concentrated hydrochloric acid. The precipitate is collected and dissolved in 5000 parts by weight of water and 12 parts by weight while hot, treated with bone black and boiled shortly. The solution is then filtered while still hot and then admixed with 280 parts by volume of concentrated sodium chloride solution. Upon cooling the product of condensation separates out; it is filtered by suction and dried in vacuum at 80° C. From acetonitrile it forms beautiful crystals. It has the following formula:

(47) 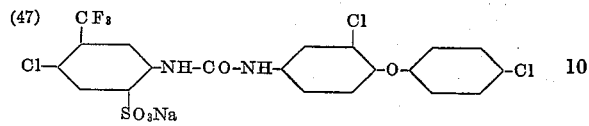

If 3-chloro-6-(4'-chlorophenoxy)-phenyl-1-isocyanate is used instead of 3-chloro-4-(4'-chlorophenoxy)-phenyl-1-isocyanate the following product is obtained:

(48) 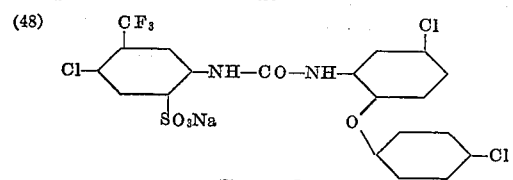

Example 31

9.1 parts by weight of 3-trifluoromethyl-4-chloroaniline-6-sulphonic acid are dissolved in 60 parts by volume of warm anhydrous pyridine and mixed with a solution of 10.4 parts by weight of 2-(4'-chlorophenoxy)-5-trifluoromethylphenyl-1-isocyanate in 25 parts by volume anhydrous pyridine. The mixture is heated several hours on the water-bath and then let stand over night. The product of condensation is worked down in a manner similar to Example 30. The product has the following formula:

(49) 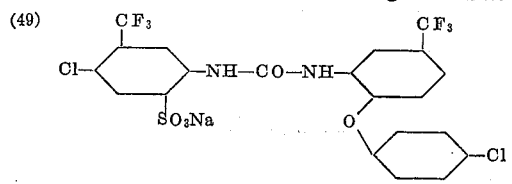

Example 32

To an aqueous emulsion of 1/10 mol 3,4-dichloro-6-sulpho-1-O-phenylurethane the calculated amount plus an excess of 10% of 2-amino-4-trifluoromethyl-4'-chloro-1,1'-diphenylether is added and heated several hours on the boiling water-bath. The mixture is diluted with water and extracted with ether. The aqueous residue is mixed with sodium chloride and the precipitated product of condensation is collected. It is dried in vacuum at 80° C. and then recrystallised from acetonitrile. The N-3,4-dichloro-6-sulphophenyl-N'-2-(4''-chlorophenoxy)-5'-trifluoromethylphenylcarbamide corresponds to the following formula:

(50) 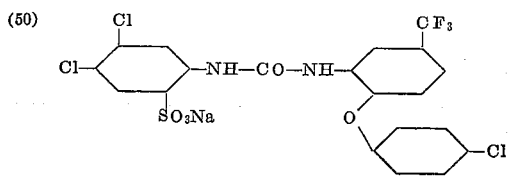

Example 33

12 parts N'-2'-(3''-methylphenoxy)-5'-trifluoromethylphenyl - N - 3,4-dichloro-6-sulphophenyl-carbamide obtained from 3-methyl-4'-trifluoromethyl-1,1'-diphenylether-2'-isocyanic acid ester and 3,4-dichloroaniline-6-sulphonic acid, are dissolved in 60 parts by volume glacial acetic acid and chlorine is introduced during one hour until the solution is saturated. The chlorinated product is precipitated with hydrochloric acid containing water as a crumbly semi-solid mass. The sulphonic acid is transformed into the sodium salt and forms then a bright powder. The constitution is probably as follows:

(51) 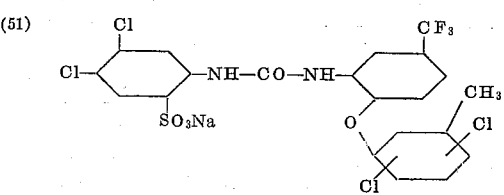

Example 34

1/20 mol 3-trifluoromethyl-4-chloroaniline-6-sulphonic acid is dissolved in warm pyridine and mixed with a solution of the equivalent amount of (3',4'-dichlorophenylsulphide)-phenyl-1-isocyanate in anhydrous pyridine. The mixture is heated several hours on the boiling water-bath and worked down as shown in Example 30. The product has the following formula:

(52) 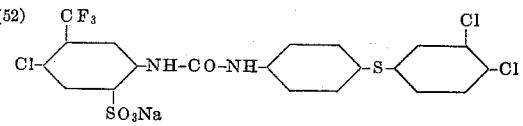

The 4-(3',4'-dichlorophenylsulphide)-phenyl-1-isocyanate is obtained in the usual manner from 4-amino-3',4'-dichloro-1,1'-diphenylsulphide with phosgene in benzenic solution.

Example 35 a. 9.3 parts cyanurchloride are dissolved in 80 parts by volume of benzene and the solution cooled to 0° C. At this temperature a solution of 1.15 parts sodium in 80 parts by volume of methylalcohol is added drop by drop with stirring. Sodium-chloride is precipitated. After 30 minutes the mixture is heated to 30–40° C., whereupon a calculated solution of 4-chloro-4'-trifluoromethyl-2'-amino-1,1-diphenylether-2-sulphonic acid which was previously neutralised with sodium carbonate in 200 parts of water, is added while vigorously stirring. After 20–40 minutes the acid which has been split off is neutralised with sodium carbonate. The mixture is then heated to 90–100° C. and the process repeated with the same amount of said ether-acid. During the subsequent heating at 90–100° C. for 2 hours, whereby the formed acid is neutralised with sodium carbonate from time to time, the benzene and the excess of methylalcohol distill off. After cooling, the disulfonic acid is precipitated with sodium chloride and dried. It forms a white powder, which is readily soluble in hot water. The product corresponds to the following formula:

(53) 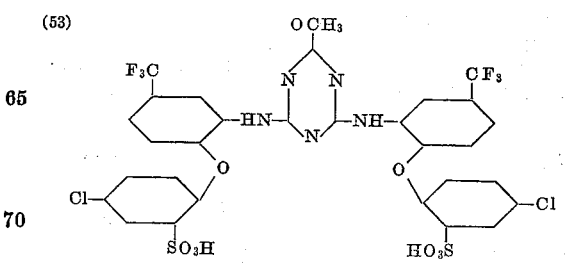

b. By similar condensation of 1 mol cyanurchloride, 1 mol ethylate, 1 mol 4-amino-4'-chloro-1,1'-diphenylether-2-sulphonic acid and 1 mol 4 - chloro - 4' - trifluoromethyl-2'-amino-1,1-diphenylether-2-sulphonic acid, the following product is obtained:

(54)

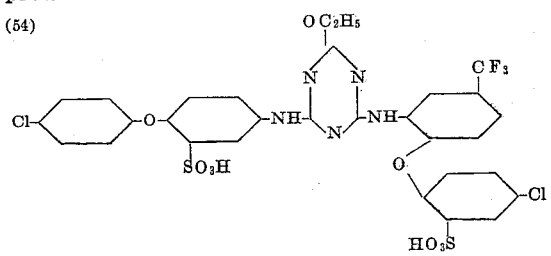

c. By condensation of 1 mol cyanurchloride with 2 mol 4-amino-4'-chloro-3'-methyl-1,1'-diphenylether-2-sulphonic acid and 1 mol 3-trifluoromethylaniline the following product is obtained:

(55)

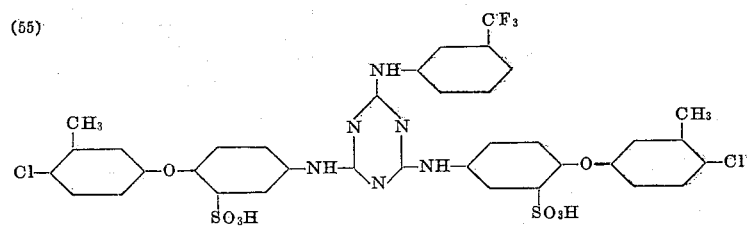

d. By condensation of 1 mol cyanurchloride with two mol 3-trifluoromethylaniline and 1 mol 4'-chloro-3'-methyl-4-amino-1,1'-diphenylether-2-sulphonic acid a condensation product of the following formula:

(56)

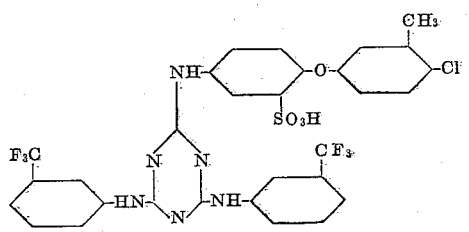

Example 36

35 parts of the product of condensation obtained by reacting 1 mol cyanurchloride with 2 mol 3'-methyl-4-amino-1,1'-diphenylether-2-sulphonic acid and replacement of the last chlorine-atom in the cyanurring by 3-trifluoromethylaniline are dissolved in 400 parts by volume glacial acetic acid and 200 parts by volume concentrated hydrochloric acid. To this solution which is heated to 45° a solution of 10 parts sodium chlorate in 100 parts water is added drop by drop within 5 hours. The precipitation is finally completed by addition of 1000 parts water. The product of chlorination worked down as usual is soluble in water but more easily soluble in diluted sodium carbonate solution. Its properties and probably its constitution correspond to Example 35c:

(57)

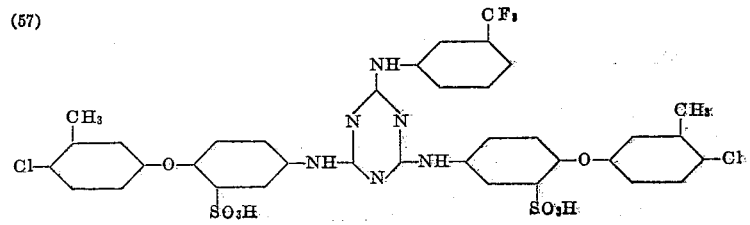

Example 37

23 parts 4,4'-dichloro-2-amino-1,1'-diphenylether-2'-sulphonic acid are suspended in 100 parts by volume of dry pyridine and mixed with 3-trifluoromethylmustard oil at 20° C. with stirring. The temperature raises slowly up to 35° C., and the sulphonic acid dissolves gradually in the mixture. After one hour no free amine can be detected. Bicarbonate-solution is added to the mixture and the pyridine is blown off with steam. The residue is diluted with 300 parts of hot water, boiled and filtered while hot. Upon addition of sodium chloride the N'-2'-(4''-chloro-2''-sulphophenoxy)-5'-chlorophenyl-N-3-trifluoromethylphenylthiocarbamide is precipitated as a viscous resin. It is dried in vacuum and forms an easily pulverisable brittle mass.

(58)

Example 38 a. Wool or wool containing material is boiled for 45 minutes to one hour with 1.5% of the weight of the wool of 4-methyl-4'-trifluoromethyl-2'-lauroylamino-1,1'-diphenylether-2-sulphonic acid (Example 1), 3–5% sulphuric acid and 10% crystalline sodium sulphate, whereupon the material is rinsed and dried. The treated material is moth proof.

b. Wool is treated at a temperature of 60° C. during 45 minutes with 0.3–0.6% (calculated on wool) N'-2'-(4''-chloro-2''-sulphophenoxy)-5'-chlorophenyl)-N-3-trifluoromethyl-4-chlorophenyl-carbamide (Example 17a) and 10–20% crystalline sodium-sulphate, rinsed and dried. The treated material is moth proof.

c. Wool or wool containing material is boiled for 45 minutes to one hour with 0.6% (calculated on wool) of the product of condensation described in Example 21, 3–4% sulphuric acid and 10% crystalline sodium sulphate, whereupon the material is rinsed and dried. The so treated product is moth-proof.

d. Wool or wool containing material is boiled for 45 minutes to one hour with 0.8% (calculated on wool) of the product of condensation described in Example 30, 3-4% sulphuric acid and 10% crystalline sodium sulphate. Thereupon the material is rinsed and dried. The so treated product is moth proof.

e. Wool is treated at elevated temperature during 45 minutes to 1 hour with 2% (calculated on wool) of a condensation product obtained from 1 mol cyanurchloride, 2 mol 4'-chloro-3'-methyl - 4 - amino - 1,1' - diphenylether - 2 - sulphonic acid and 1 mol 3-trifluoromethylaniline (Example 35c), 4% sulphuric acid and 10% crystalline sodium sulphate. After rinsing and drying the product is moth proof.

It will be seen that the great majority of the above compounds set forth are of the general form

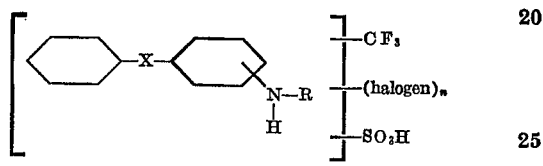

where X is one of the group sulfur and oxygen and R monocyclic aromatic mono acyl radical. As shown in Compound 2 the halogen may be in both R and the ether with CF₃ in the ether. Compound 9 shows no halogen in R but in the ether, while Compound 11 shows CF₃ in both the ether and R. Compound 16 shows halogen in the ether and only —CF₃ in R. It is thus seen that —CF₃ and halogens, such as chlorine, may be located in either or both the ether and R. The —CF₃ preferably is meta to an N, but not necessarily, as in Compound 30, R includes ether acyls such as in Compounds 15, 41, 42 and other examples as shown. The sulfonic acid group may be in R as in Compounds 8, 9, 41, 48 as well as in the ether portion.

What I claim is:

1. Trifluoromethyl substituted halogenated amino-sulfonic acid compounds of the general formula

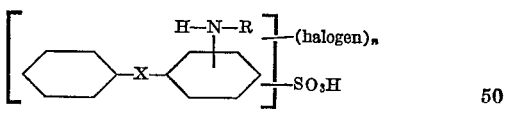

where $n$ is a number from 1 to 4 and X is a member of the group consisting of oxygen and sulfur, and R is a monocyclic aromatic mono acyl radical, there being at least one —CF₃ group in a nucleus in the compound.

2. Trifluoromethyl substituted compounds of chlorinated sulfonic acids having the general formula

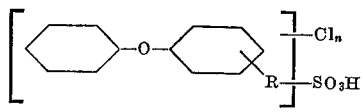

where $n$ is a number from 1 to 4 and R is a phenyl urea radical, said compounds containing at least one trifluoromethyl group in a nucleus in the compound.

3. The compound

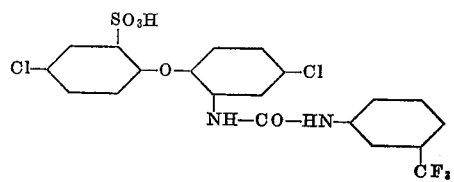

4. The compound

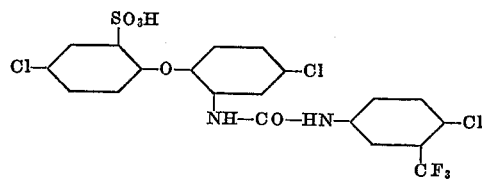

5. The compound

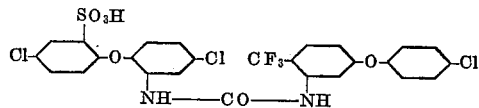

6. The compound

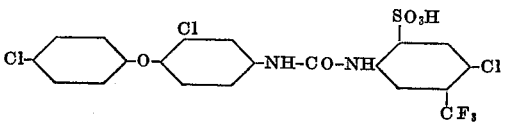

HENRY MARTIN.

References Cited in the file of this patent

UNITED STATES PATENTS

| Number | Name | Date |
|---|---|---|
| 2,119,882 | Kracker et al. | June 7, 1938 |
| 2,141,893 | Zitscher et al. | Dec. 27, 1938 |
| 2,299,834 | Martin et al. | Oct. 27, 1942 |
| 2,311,062 | Martin et al. | Feb. 16, 1943 |
| 2,328,159 | Martin et al. | Aug. 31, 1943 |
| 2,424,477 | Martin et al. | July 22, 1947 |